Patented July 18, 1939

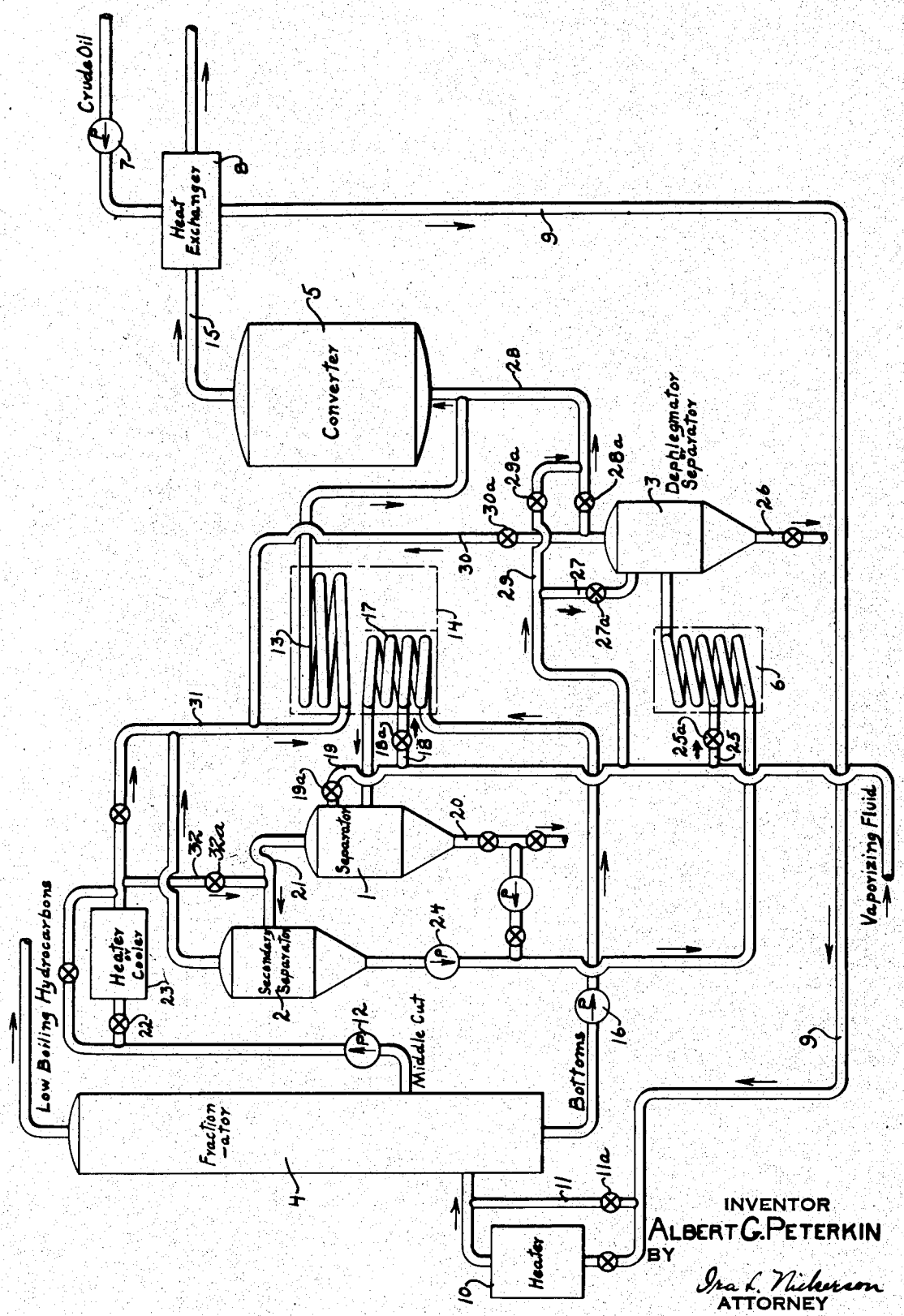

2,166,176

UNITED STATES PATENT OFFICE 2,166,176

PREPARATION OF CHARGE

Albert G. Peterkin, Bryn Mawr, Pa., assignor to Houdry Process Corporation, Dover, Del., a corporation of Delaware Application February 21, 1936, Serial No. 65,013

8 Claims. (Cl. 196—52)

The present invention relates to the art of treating composite materials, especially fluids having a wide boiling range and containing components which may be undesirable for certain operations. It has particular reference to operations where it is desired to have the material to be treated completely in the vapor phase. Illustrative of the composite materials which it is contemplated to treat are hydrocarbons, including those of petroleum, coal, shale or other origin, natural or artificial. In this class of materials are crude petroleum oils, topped crudes and also bottoms or residual fractions thereof.

When these materials are charged directly to a reaction chamber such as a cracking still or other conversion or transformation chamber, for example, to a converter containing a contact mass or catalyst, considerable difficulty is often encountered because of the presence of undesirable material, usually in small amount, which tends to promote condensation and to cause coking or obstruction of the apparatus. To minimize this difficulty, large amounts of steam or other fluid have been used in some instances as an aid to vaporization, involving a considerable expense. Other expedients have been to employ temperatures of reaction above the optimum or to effect a costly or wasteful fractionation of the charge.

A purpose of this invention is to prepare a clean, vaporous charging stock for a transformation or conversion, for example for a catalytic transforming operation, from a composite material, such as from the hydrocarbon materials above indicated, and to do this efficiently and economically. Another object is to free the charge of all the undesirable heavy and high boiling components present. Another object is to minimize the amount of steam or other fluid needed to free the charge of undesirable components and to present it in proper vapor phase condition for conversion, e. g., in clean, dry saturated or preferably superheated state. Another object involves the treatment or processing of composite material such as crude oil or topped crude or distillation bottoms, by elimination of the highest boiling deleterious components with a minimum sacrifice of desirable vaporizable materials. Still another object includes separating out portions of a crude oil which do not favorably lend themselves to direct conversion into valuable products, subjecting such portions to a mild conversion or viscosity breaking operation and then separating the lighter portions of the resultant product from the remaining heavy high boiling material. A further object involves a two-stage separation of undesirable, heavy components from a vapor liquid stream directed toward a reaction chamber or converter.

Further objects and advantages as well as a quick understanding of the invention can best be obtained by reference to the accompanying drawing in the single figure of which:

1 represents a tar separator or equivalent flash chamber fractionator or the like, 2 represents a tar separator or partial condenser, 3 represents a tar separator or partial condenser, 4 represents a fractionating column or equivalent, 5 represents a converter, which by way of illustration may be considered to be a converter containing a contact mass or catalyst, and 6 is a viscosity breaker or an apparatus in which a mild cracking can be effected. While 6 is illustrated as a thermal viscosity breaker, it may be any other type of viscosity breaker, such as a chamber containing an inert or relatively inert contact mass, such, for example, as disclosed in United States Patent No. 1,818,403, issued August 11, 1931 to Alfred Joseph.

The invention is illustrated by considering a crude oil as the material from which a charging stock for a converter is to be prepared. Crude oil may be forced by pump 7 through heat exchanger 8 and thence through line 9 and heater 10 (or partly or wholly through line 11 controlled by valve 11a) into fractionating column 4. Low boiling hydrocarbons, consisting of low boiling gases, gasoline and preferably also kerosene or light kerosene fractions, are withdrawn from the top of the fractionator. A middle cut, which is preferably a deep cut including everything from the kerosene range to the heaviest components of the crude which can be vaporized without a substantial amount of thermal cracking, is withdrawn from an intermediate point of the fractionating column and may be forced by pump 12 through the lines shown leading to heating or superheating coils 13, which may comprise the radiation bank of coils within a heater or furnace 14. From the superheating coils 13, vapors may pass through the line shown to converter 5. From the converter 5 reaction products leave through line 15 and, en route to storage tanks or other receptacles or apparatus, are cooled in passage through heat exchanger 8.

The bottoms cut or fraction from the fractionating column 4, comprising high boiling components of the crude having a gravity of, for example, 5° to 20° A. P. I., is withdrawn through the line shown and forced by pump 16 through coils 17, which may comprise the convection bank of coils of furnace 14, into tar separator 1. The hydrocarbon material entering tar separator 1 will be at a temperature of the order of 850° to 1000° F., with a preferential range of about 875° to 950° F., 925° F. being a good temperature in the case of a number of crude oils, e. g., East Texas crude oil. A vaporizing fluid such as steam, in quantities of the order of 1 or 2% to 20% or so by weight of the bottoms may be introduced with the latter through line 18, controlled by valve 18a. Amounts of the order of 10% by weight of the bottoms will be suitable with certain oil stocks such as the East Texas crude mentioned. In any event, the amount of vaporizing fluid is sufficiently large to control to the desired degree or eliminate thermal cracking in the coil 17. Additional amounts of steam may be introduced into admixture with the hydrocarbons in separator 1 through branch 19, controlled by valve 19a. The steam introduced through branch 19 may be in small amounts up to 5% or sometimes 10% of the charge to the separator, the amount of steam preferred being that which will control the character of the heavy tar or liquid withdrawn from separator 1 through line 20 to the consistency desired. It is preferable that no readily useful materials for conversion, i. e., materials from which gasoline or the like can be produced without the attendant production of relatively large amounts of coke and gas, be withdrawn through line 20. In short, the fluid withdrawn through line 20 is usually controlled by regulating the proportion of steam added to the charge to separator 1 so that it is of a very heavy tarry nature, having a gravity of the order of 5° to 15° A. P. I., as for example, 10° A. P. I., and is not capable of being used to advantage in further processing for the production of motor fuel but can find use as a starting material in the production of asphalts or the like or as a heavy fuel. However, liquid withdrawn from separator 1 may be forced by the pump shown into the line leading to viscosity breaker 6. If this option is followed, normally a somewhat lighter material, e. g., one having a gravity of 8° to 20° A. P. I., may be withdrawn from separator 1 through line 20.

Vaporous materials are withdrawn from separator 1 through the line 21 and pass into separator 2, where the components of the charge which are too high boiling to be held in the form of vapors for conversion at the temperature and pressure desired in the converter 5 are condensed and separated out. The desired temperature in the case of catalytic conversion, for example, may be of the order of 750° to 950° F., depending upon the particular catalyst employed and the conditions of operation.

The catalyst or contact mass may be of any known or desirable type. Suitable contact masses include, by way of illustration, silicious materials, as for example naturally occurring or artificially prepared blends or mixtures of silica and alumina, preferably in molded or fragmentary pieces, and, where desired, having metal oxide or oxides admixed therewith. This type of contact mass is illustrated in copending application of Eugene J. Houdry, Serial No. 35,101, filed August 7, 1935. With certain charging stocks, including stocks such as East Texas crude, mentioned above, and with a contact mass, such as the types just mentioned, transformation temperatures of the order of 810° to 925° F. are often employed.

Controlled amounts of the middle cut from fractionator 4, for example amounts of the order of 1 to 15% by weight of the overhead from separator 1, may be introduced through line 32, controlled by valve 32a and pass through line 21, with the charge, to separator 2. The temperature of the middle cut, so introduced, may be controlled by passing any desired proportion of or the whole middle cut from column 4 through valve 22 and heat exchanger 23. The temperature of the middle cut may be from about 250° F. upwards to a temperature preferably not in excess of its average boiling point. Since the purpose of introducing a proportion of the middle cut is to effect a partial condensation of the vapors passed from separator 1 to separator 2, the temperature of the middle cut must, of course, be below its average boiling point. The higher the temperature of the cut admitted to separator 2, the higher in general will be the amount of the middle cut required; whereas where lower temperatures, for example, of the order of 250 to 400° F. are employed, relatively lower amounts of middle cut will be required to effect the desired partial condensation. The character of the partial condensation is controlled so that the overhead from separator 2 will consist of a clean stock which readily will remain in the vapor phase in converter 5 under the conditions of temperature and pressure desired therein, e. g., under temperatures of the order of 810° to 925° F. and pressures of the order of 1 to 5 atmospheres and so that the condensate is of such a character that it can be mildly cracked in viscosity breaker 6 without necessitating the use of large amounts of steam and without producing large amounts of coke and gas.

The bottoms from separator 2 are forced by pump 24 through heating coil or viscosity breaker 6 to effect a mild cracking operation and from there the residual material passes into separator 3. Small amounts of steam, for example, 1% more or less by weight of the bottoms withdrawn from separator 2, may be introduced into the viscosity breaker through line 25, controlled by valve 25a, thereby to control the viscosity breaking operation and to minimize the formation of carbon. The tar separator or fractionator 3 is operated so that heavy liquid withdrawn therefrom through line 26 will be of a high boiling refractory character making it unsuitable for conversion into motor fuel or gasoline. The particular conditions of separator 3 may be controlled by the admission of suitable amounts of steam or the like, e. g., 1, 2 or 5% thereof, through line 27, controlled by valve 27a. The gravity of the heavy liquid leaving separator 3 through line 26 may be of the order of 5° to 12° A. P. I.

When the vapors and steam or equivalent leaving separator 3 are of sufficiently high temperature, they may be passed directly through line 28, controlled by valve 28a to the converter 5 with the possible addition of further small amounts of steam, if desired, through line 29, controlled by valve 29a. But if such vapors are not of a sufficiently high temperature to be passed directly to the converter 5, they may be passed through line 30, controlled by valve 30a and be admixed with the middle cut in line 31, preceding the superheating coils 13.

Then the mixture of the middle cut together with vapors entering line 31 from separator 2 and those entering line 31 from separator 3 may be passed together through the heater 13 to the converter 5. The temperature of the reactants in the line leading to the converter is usually from 10° to 40° or 50° F. higher than the temperature desired in the converter; as for example, where a temperature of 840° F. is desired within the converter 5, a stream of reactants passing thereto may be at a temperature of from 850° to 880° or 890° F., for example, depending upon various conditions of operation including, for example, how strongly endothermic is the transformation or conversion. However, when there is provision for heat input in the reaction chamber or within the catalytic mass, as for example, in certain copending applications including that of E. J. Houdry et al. Serial No. 728,544 filed June 1, 1934, the reactants may be charged at or even below the desired reaction temperature.

It will be noted that all or practically all of the materials suitable for conversion are separated from the undesirable or very heavy high boiling carbonaceous tarry and asphaltic components of the crude oil or composite charge in an efficient manner and with the use of a minimum of steam or equivalent vaporizing fluid. Also, it will be seen that other components of the composite material, which are suitable, after additional treatment, for charging to a converter, are separated out, subjected to a viscosity breaking operation and the resultant desirable products are added to the vapor phase stream sent to converter 5. It will be seen that the steam, or equivalent, used to control the viscosity braking reaction and that employed to assist in vaporization and separation of desirable components from the high boiling, undesirable components, is further utilized, e. g. in a special manner of the type illustrated, in subsequent heating or superheating and/or conversion for desired purposes, for example to keep down thermal cracking in the heating step and to serve as a desired auxiliary fluid in the conversion step. In other words, the invention makes an effective removal of tar and asphalt so as to present a substantially clean charge in vapor phase having the desired content of steam (or other gaseous material) for the transforming reaction with an economical use of the same.

While the invention is illustrated in connection with entire crudes, it will be readily apparent that it is equally applicable to the treatment of a topped crude or a crude from which the light fractions such as gasoline have already been removed, for, as is apparent, the low boiling hydrocarbons such as gasoline play no essential part in the major aspects of this invention. Also, the invention, or rather a major aspect thereof, is illustrated by employing as charge a bottoms or residual fraction from a crude rather than the entire or a topped or crude oil. For this material column 4 would not be required; instead, the bottoms fraction would be pumped directly to heater 17, and its progress is then essentially the same as in the particular illustrative embodiment described above. Where material of the nature of the middle cut is desired to control partial condensation in separator 2, which is not necessarily required in the broadest aspect of my invention, the same may be supplied from a separate source. The required amounts of such material are small, as of the order above specified, as for example, 2 to 5% of the vapors passing from separator 1 to separator 2 where the temperature of such lower boiling fraction is kept substantially below its average boiling point.

The present invention, while having some very general relation to that involved in my copending application, Serial No. 65,955, filed February 27, 1936, distinguishes therefrom. In particular, in the present invention the composite fluid charge is separated into a bottoms fraction and one or more lighter fractions including an intermediate fraction, the bottoms fraction is vaporized without any substantial cracking or conversion with the aid of a vaporizing fluid and the vapors so produced may be mingled with the intermediate fraction and passed to a conversion zone under conditions desired for vapor phase conversion; whereas in my aforesaid copending application any bottoms separated from the charge to the process are subjected to a conversion or viscosity breaking before being recombined with any other vapors passing to a cracking zone.

What I claim is:

1. In an operation for attaining a high yield of desired low boiling hydrocarbons within the light motor fuel or gasoline boiling range from a composite hydrocarbon starting material of wide boiling range, containing components which are too high boiling and of too high molecular weights to be capable of being vaporized by heat alone without substantial thermal cracking thereof along with lower boiling hydrocarbons including readily vaporizable materials higher boiling than the desired low boiling motor fuel product or gasoline, the steps of process which include dividing said composite material into a bottoms or residual fraction, containing difficultly vaporizable components of said starting material, and at least one distillate fraction consisting primarily of components above the said light motor fuel or gasoline boiling range and below the boiling range of said residual fraction, heating a continuous stream of said bottoms fraction with the aid of a vaporizing fluid so as to vaporize the same to substantial extent without causing substantial conversion of components of said bottoms fraction into lower boiling hydrocarbons, continuously passing said heating stream into a separating zone and therein separating unvaporized liquids from vapors, withdrawing liquids from said separating zone as one stream and withdrawing vapors, including hydrocarbon vapors and vaporizing fluid, therefrom as a second stream, combining said second stream with the aforesaid distillate fraction at desired temperature, thereafter raising the temperature of the resulting combined stream of vapors sufficiently so that it will approximate the temperature desired for the subsequent conversion step and will be in a state of superheat, then passing said stream of vapors into a confined reaction zone containing solid, adsorptive silicious catalytic material and being maintained under conditions so as to effect a cracking or transformation of hydrocarbons charged thereto to a large extent into desired low boiling hydrocarbons or gasoline, and withdrawing a stream of products of reaction from said confined reaction zone.

2. In an operation for attaining a high yield of desired low boiling hydrocarbons within the light motor fuel or gasoline boiling range from a composite hydrocarbon starting material of wide boiling range, containing components which are too high boiling and of too high molecular weights to be capable of being vaporized by heat alone without substantial thermal cracking thereof along with lower boiling hydrocarbons including readily vaporizable materials higher boiling than the desired low boiling motor fuel product or gasoline, the steps of process which include dividing said composite material into a bottoms or residual fraction and at least one distillate fraction consisting primarily of components above the said light motor fuel or gasoline boiling range, heating a continuous stream of said bottoms fraction with the aid of a vaporizing fluid so as to vaporize the same to substantial extent without causing substantial conversion of components of said bottoms fraction into lower boiling hydrocarbons, continuously passing said heated stream into a separating zone and therein separating unvaporized liquids from vapors, withdrawing liquids from said separating zone as one stream and withdrawing vapors, including hydrocarbon vapors and vaporizing fluid, therefrom as a second stream, adding additional vaporizing fluid to said vapors, combining the resulting stream of vapors with a stream of the aforesaid distillate fraction at desired temperature, passing the resulting combined stream through a heating zone wherein said combined stream is brought up to a temperature approximating that desired for the subsequent conversion and the vapors are superheated while avoiding any substantial conversion thereof into lower boiling hydrocarbons, then passing said stream of vapors into a confined reaction zone containing solid adsorptive incombustible catalytic material and being maintained under conditions so as to effect a cracking or transformation of hydrocarbons charged thereto to a large extent into desired low boiling hydrocarbons or gasoline, and withdrawing a stream of products of reaction from said confined reaction zone.

3. In the preparation of a hydrocarbon charge for a conversion operation from a composite material having a substantial boiling range and containing components which are undesirable because of their heavy, high-boiling character, the steps of process which comprise dividing said composite material into a bottoms fraction and at least one distillate fraction, vaporizing a substantial portion of said bottoms fraction with the aid of heat and a vaporizing fluid and without effecting substantial conversion of said fraction into gasoline, passing such fraction together with vaporizing fluid into a separating zone to separate unvaporized liquid from vapors, withdrawing unvaporized heavy material from said zone and passing a stream of the resultant vapors, and the vaporizing fluid admixed therewith, from said separating zone to a second separating zone or partial condensing zone, introducing into said second zone a portion of said distillate fraction so as to effect a controlled partial condensation of the vapors in said second zone, passing a stream of vapors from said second zone to a conversion zone, withdrawing condensed fluid material from said second zone and subjecting it to a mild cracking operation to effect a viscosity breaking thereof without producing large amounts of gasoline, passing the viscosity broken material to a third separating zone, therein dividing said viscosity broken material into a liquid fraction and a vapor fraction, withdrawing said liquid fraction from said third zone, and passing said vapor fraction from said third zone, together with the aforesaid vapors from said second zone, into the aforesaid conversion zone, the latter containing solid adsorptive incombustible contact material and being maintained under conditions so as to effect a cracking or transformation of hydrocarbons charged thereto into lower boiling hydrocarbons.

4. In an operation for attaining a high yield of desired low boiling hydrocarbons within the light motor fuel or gasoline boiling range from a composite hydrocarbon starting material of wide boiling range, containing components which are too high boiling and of too high molecular weights to be capable of being vaporized by heat alone without substantial thermal cracking thereof along with lower boiling hydrocarbons including readily vaporizable materials higher boiling than the desired low boiling motor fuel or gasoline, the steps of process which include dividing said composite material into a bottoms or residual fraction and at least one distillate fraction consisting primarily of components above the said light motor fuel or gasoline boiling range, heating a continuous stream of said bottoms fraction with the aid of a vaporizing fluid so as to vaporize the same to a large extent without causing substantial conversion of components of said bottoms fraction into lower boiling hydrocarbons, continuously passing said heated stream into a separating zone and therein separating unvaporized liquids from vapors, withdrawing liquids from said separating zone as one stream and withdrawing vapors (including hydrocarbon vapors and vaporizing fluid) therefrom as a second stream, combining the last-mentioned or second stream with at least a substantial proportion of the aforesaid distillate fraction, the latter being at a temperature below its average boiling point when admixed with said vapors so as to effect a partial condensation of the latter, continuously separating a stream of condensed liquid from remaining vapors in a second separating zone or condensing zone, passing said remaining vapors as a continuous stream from said second separating zone through a heating zone so as to superheat the same without substantial cracking or conversion thereof into lower boiling hydrocarbons, subjecting said stream of condensed liquid to a mild cracking operation to effect a viscosity breaking thereof without causing any substantial production of gasoline, combining that portion of the products of said viscosity breaking operation having a boiling range similar to the vapors from said second separating zone with the latter at desired temperature, and passing the last-mentioned combined stream into a confined reaction zone containing solid adsorptive incombustible catalytic material and being maintained under conditions so as to effect a cracking or transformation of hydrocarbons charged thereto to a large extent into desired low boiling hydrocarbons or gasoline, and withdrawing a stream of products of reaction from said confined reaction zone.

5. In the preparation of a substantially uncracked hydrocarbon charge for a conversion operation from a bottoms or residual hydrocarbon fraction, said bottoms fraction being made up of components too high boiling to be capable of being vaporized upon heating alone without substantial thermal cracking thereof, the steps of process which comprise heating and substantially vaporizing said bottoms fraction with the aid of a vaporizing fluid and without effecting substantial conversion of said fraction into lower boiling hydrocarbons, passing said heated fraction together with said admixed vaporizing fluid into a separating zone, separating unvaporized liquids from vapors in said separating zone, withdrawing liquids from said separating zone, passing a stream of vapors from said zone into a partial condensing zone, introducing into said partial condensing zone a stream of hydrocarbon fluid having a boiling range lower than that of said vapors but higher than that of gasoline, in controlled amount and at controlled temperature below its average boiling point, to effect a partial condensation of the said vapors introduced thereinto from said separating zone so as to remove higher boiling components which, if left in the vapors, would cause condensation and coke formation in the cracking or reaction zone defined below, withdrawing a stream of condensate from said partial condensing zone, subjecting said condensate to a mild cracking operation to effect a viscosity breaking thereof, separating heavy, high-boiling components as liquids from the remaining vaporous products of such viscosity breaking operation, and adjusting the last-mentioned vaporous products and the stream of vapors from said partial condensing zone to a temperature suitable for catalytic conversion thereof, then passing said vaporous products and said stream of vapors together through a confined reaction zone containing a catalytic mass and maintained under conditions such as to effect a conversion of the hydrocarbons charged thereto into lower boiling hydrocarbon products, and withdrawing a stream of fluid products of reaction from said reaction zone.

6. In the preparation of a hydrocarbon charge for a conversion operation from a bottoms or heavy hydrocarbon fraction containing components too high boiling to be capable of being vaporized upon heating alone without substantial thermal cracking thereof, the process steps which comprise heating and vaporizing said bottoms fraction to substantial extent with the aid of steam as a vaporizing fluid and without effecting substantial conversion of said fraction into lower boiling hydrocarbons, passing said heated fraction together with admixed vaporizing fluid into a separating zone, separating unvaporized liquids from vapors in said separating zone, separately withdrawing liquids and vapors from said separating zone, mixing additional steam with the vapors leaving said zone, passing said vapors from said zone into admixture with an additional stream of hydrocarbon fluid having a lower boiling range than said vapors but a substantially higher boiling range than gasoline, said hydrocarbon fluid being at such temperature below its average boiling point and in such proportion as to effect a partial condensation of said vapors to remove the heaviest, highest boiling components therefrom, passing the remaining vapors through a heating zone where they are raised to a temperature of superheat, and passing the superheated vapors through a zone containing an adsorptive, silicious catalyst maintained at a temperature of the order of 810° to 925° F.

7. Apparatus for preparing a hydrocarbon charge for a vapor phase reaction or conversion from a composite hydrocarbon material having a substantial boiling range and containing components which are undesirable because of their heavy, high-boiling character, which comprises, in combination, means for heating and vaporizing a bottoms or residual fraction of said composite material, a separating vessel connected to said heating and vaporizing means, said vessel being provided with an overhead outlet for vapors and a bottoms draw-off for unvaporized liquid, partial condensing means provided with separate outlets for vapors and condensate respectively, a conduit for passing said vapors from said overhead outlet to said partial condensing means, means including a heater for effecting a moderate cracking of heavy high boiling hydrocarbon fluids, a conduit for passing said condensate from the liquid outlet of said partial condensing means to the last-named means, a tar separator following and connected to said last-named means, a converter containing solid adsorptive catalytic material, and ducts for passing vapors from said tar separator and from the vapor outlet of the aforesaid partial condensing means to said converter.

8. Apparatus for preparing a hydrocarbon charge for vapor phase reaction from composite hydrocarbon material having a substantial boiling range and containing components which are undesirable because of their heavy, high-boiling character, and for transforming the charge into lower boiling hydrocarbon products, which comprises, in combination, a fractionator for composite hydrocarbon material, a heater preceding and connected by a duct to said fractionator, means for forcing composite hydrocarbon material through said heater into said fractionator, said fractionator providing for separating, from the material charged to it, a bottoms fraction comprising high boiling components and a middle cut comprising components ranging from the lowest boiling of said bottoms fraction to those having a boiling point of the order of kerosene components, means following said fractionator and connected thereto for heating and partially vaporizing said bottoms fraction, a separator following and connected to said heating means to separate high boiling unvaporized hydrocarbons from vapors, said separator providing an overhead outlet for vapors and a bottom outlet for unvaporized liquid, a partial condenser, said partial condenser also providing separate outlets for vapors and condensate respectively, a conduit for passing vapors from the overhead outlet said separator to said partial condenser, a duct for withdrawing heavy liquid hydrocarbons from the liquid outlet of said partial condenser, a line from said fractionator for withdrawing the aforesaid middle cut therefrom, means including a duct by which a controlled amount of said middle cut can be passed from said line to said partial condenser, a converter providing a reaction chamber containing a solid adsorptive incombustible catalyst, and a line for passing vapors from the vapor outlet of said partial condenser to the reaction chamber of said converter.

ALBERT G. PETERKIN.

CERTIFICATE OF CORRECTION.

Patent No. 2,166,176.  July 18, 1939.

ALBERT G. PETERKIN.

It is hereby certified that error appears in the printed specification of the above numbered patent requiring correction as follows: Page 3, first column, line 32-33, for the word "braking" read breaking; and second column, line 44, claim 1, for "heating" read heated; page 5, second column, line 50, claim 8, after "outlet" insert of; and that the said Letters Patent should be read with this correction therein that the same may conform to the record of the case in the Patent Office.

Signed and sealed this 22nd day of August, A. D. 1939.

Leslie Frazer (Seal)

Acting Commissioner of Patents.